United States Patent

(12) United States Patent
Perez-Sanchez et al.

(10) Patent No.: US 7,293,744 B2
(45) Date of Patent: Nov. 13, 2007

(54) LIFT-FLAP MECHANISM

(75) Inventors: Juan Perez-Sanchez, Feldolling (DE);
Claudia Bechheim, Hoehenkirchen (DE); Martin Voglsinger, Assling (DE)

(73) Assignee: EADS Deutschland GmbH, Ottobrunn (DE)

( * ) Notice: Subject to any disclaimer, the term of this patent is extended or adjusted under 35 U.S.C. 154(b) by 509 days.

(21) Appl. No.: 10/483,380

(22) PCT Filed: Jul. 4, 2002

(86) PCT No.: PCT/EP02/07399

§ 371 (c)(1),
(2), (4) Date: Sep. 13, 2004

(87) PCT Pub. No.: WO03/008266

PCT Pub. Date: Jan. 30, 2003

(65) Prior Publication Data

US 2005/0040294 A1    Feb. 24, 2005

(30) Foreign Application Priority Data

Jul. 12, 2001    (DE) ................................ 101 33 920

(51) Int. Cl.
*B64C 9/28* (2006.01)
(52) U.S. Cl. .............. 244/211; 244/212; 244/215; 244/216
(58) Field of Classification Search .............. 244/211, 244/212, 215, 216
See application file for complete search history.

(56) References Cited

U.S. PATENT DOCUMENTS

| 4,434,959 A | | 3/1984 | Rudolph ............. 244/215 |
| 4,448,375 A | * | 5/1984 | Herndon ............. 244/216 |
| 4,669,687 A | * | 6/1987 | Rudolph ............. 244/215 |
| 4,702,442 A | | 10/1987 | Weiland et al. ............. 244/216 |
| 5,230,487 A | * | 7/1993 | Gartelmann et al. ......... 244/216 |

FOREIGN PATENT DOCUMENTS

| DE | 26 11 918 | 11/1976 |
| DE | 196 47 077 | 5/1998 |
| EP | 0 081 610 | 6/1983 |
| SE | 515 029 | 5/2001 |

* cited by examiner

*Primary Examiner*—J. Woodrow Eldred
(74) *Attorney, Agent, or Firm*—Crowell & Moring LLP

(57) ABSTRACT

Lift flap mechanism for adjusting a lift flap assigned to an airplane wing by means of a driving system, the lift flap mechanism comprising a main connection mechanism and a secondary connection mechanism in the form of a guide lever disposed in an articulated manner on the lift flap and the flap track, the main connection mechanism having a steering lever arrangement with at least one steering lever which has a first steering lever joint and a second steering lever joint, the at least one steering lever by way of a pendulum coupled to the first steering lever joint being connected with the flap track, and the second steering lever joint being guided such that, by means of a defined angular position of the at least one steering lever, the positions of the main connection joint and of the secondary connection joint are unambiguously determined.

15 Claims, 16 Drawing Sheets

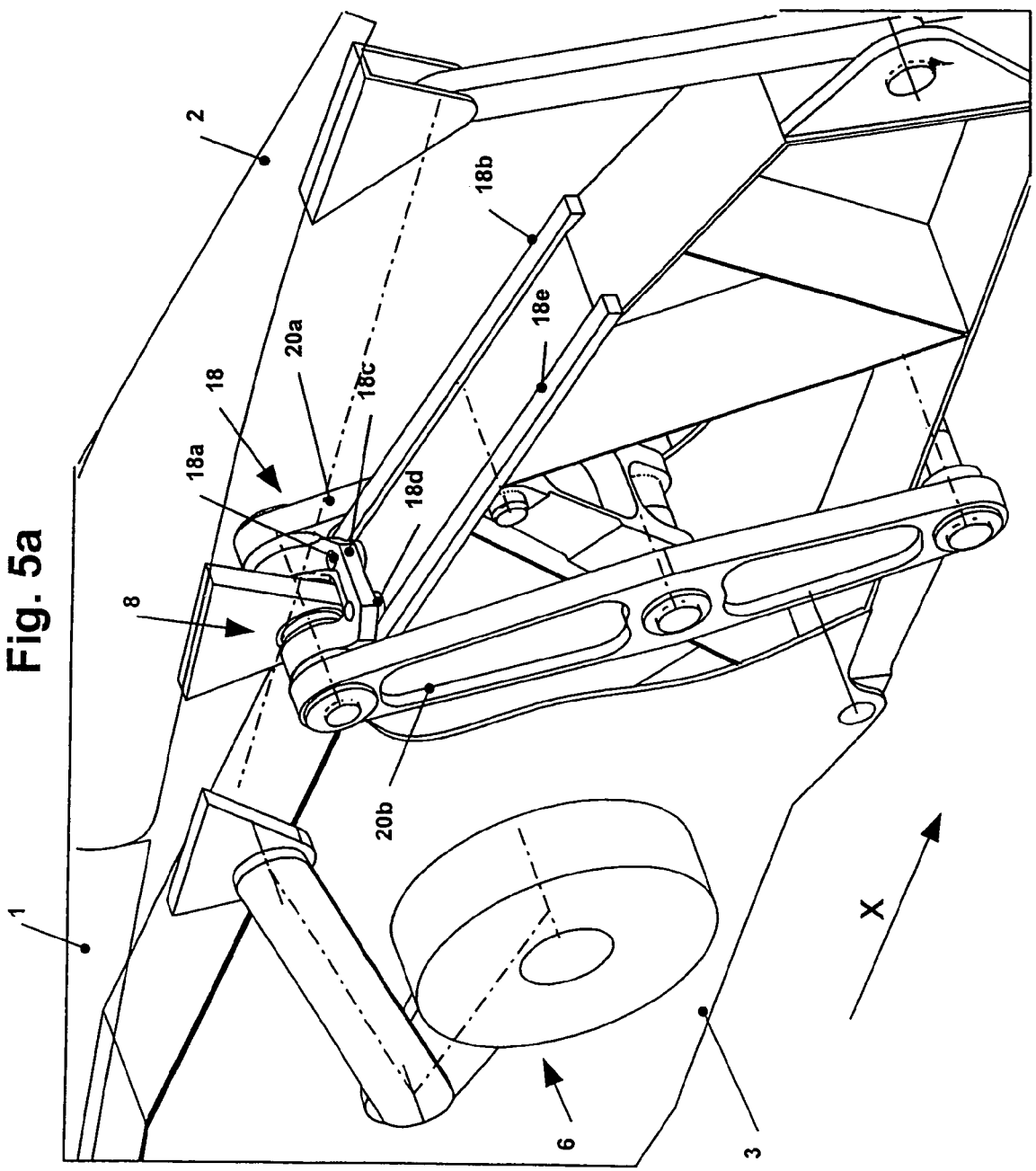

LIFT-FLAP MECHANISM

The invention relates to a lift flap mechanism for adjusting lift flaps which are arranged on an airplane wing and can be extended and retracted.

In this context, lift flaps are flaps on a manned or unmanned airplane, which influence the lift caused by the structure of the airplane. Such lift flaps may be uplift slats, such as the leading edge slats or trailing edge flaps of a transport or passenger plane, as well as trimming surfaces, braking surfaces or control surfaces of any type.

Such a lift flap mechanism is known in the case of the Airbus A340 airplane model. In this case, flap tracks are provided which are fastened to the airplane wing and each have a roller path which is used for a quasi-linear guidance of the lift flap during its adjustment and for carrying the main load of the flap. For this purpose, rolling carriages with steel rollers are fastened to the lift flap, each of the carriages running on a roller path having a rail flange. For adjusting the angular position of the lift flap as a function of the position of the roller carriage, a lever articulation is provided at a distance from the roller carriage, which lever articulation, spaced away from the roller carriage, connects with lift flap with one support respectively. The adjustment takes place by means of a rotatory actuating drive which is connected with the lift flap by way of driving arms.

It is a disadvantage of these lift flap mechanisms that very large loads are transmitted from the steel rollers to the rail flanges and stress the latter with respect to bending, so that large thicknesses of material are required. These have a very unfavorable effect with respect to weight, particularly in the case of very large wing structures.

It is therefore an object of the invention to provide a flap mechanism in the case of the quasi-linear guidance of the lift flaps, by means of which flap mechanism, the weight can be reduced.

This object is achieved by a lift flap mechanism for adjusting a lift flap assigned to an airplane wing by means of a driving system, the lift flap mechanism being disposed on at least one of several flap tracks fastened to the airplane wing, the lift flap mechanism, for carrying the load and for the kinematic guidance of the lift flap, comprising a main connection mechanism and a secondary connection mechanism in the form of a guide lever disposed in an articulated manner on the lift flap and the flap track, which secondary connection mechanism, viewed in the flow direction, is arranged at a distance from the main connection mechanism, wherein the main connection mechanism has a steering lever arrangement with at least one steering lever which has a first steering lever joint and a second steering lever joint, the at least one steering lever by way of a pendulum coupled to the first steering lever joint being connected with the flap track, and the second steering lever joint being guided such that, by means of a defined angular position of the at least one steering lever, the positions of the main connection joint and of the secondary connection joint are unambiguously determined.

In the case of the lift flap mechanism according to the invention, for carrying the load and for the kinematic guidance of the lift flap, a main connection mechanism is provided and a secondary connection mechanism in the form of a guide lever disposed in an articulated manner on the lift flap and the flap track is provided, which secondary connection mechanism, viewed in the flow direction, is arranged at a distance from the main connection mechanism. The main connection mechanism has a steering lever arrangement with at least one steering lever which has a first steering lever joint and a second steering lever joint, the at least one steering lever, by way of a pendulum coupled to the first steering lever joint being connected with the flap track, and the second steering lever joint being guided such that, at a defined angular position of the at least one steering lever, the positions of the main connection joint and of the secondary connection joint are unambiguously defined. The guidance of the second steering lever joint may be designed according to different embodiments according to the invention.

It is an advantage of the lift flap mechanism according to the invention that the transmission of main loads by means of rollers can largely be eliminated so that, in comparison to mechanisms of the prior art, this lift flap mechanism results in a reduction of weight.

Another advantage of the invention is the fact that, by means of a few changes of the mechanism, a plurality of extension curves of the lift flap can be created.

In the following, the invention will be described by means of the attached figures.

BRIEF DESCRIPTION OF THE DRAWINGS

FIG. 5a is a perspective representation of the flap mechanism of the invention according to FIG. 5;

DETAILED DESCRIPTION OF THE DRAWINGS

Figure 1:
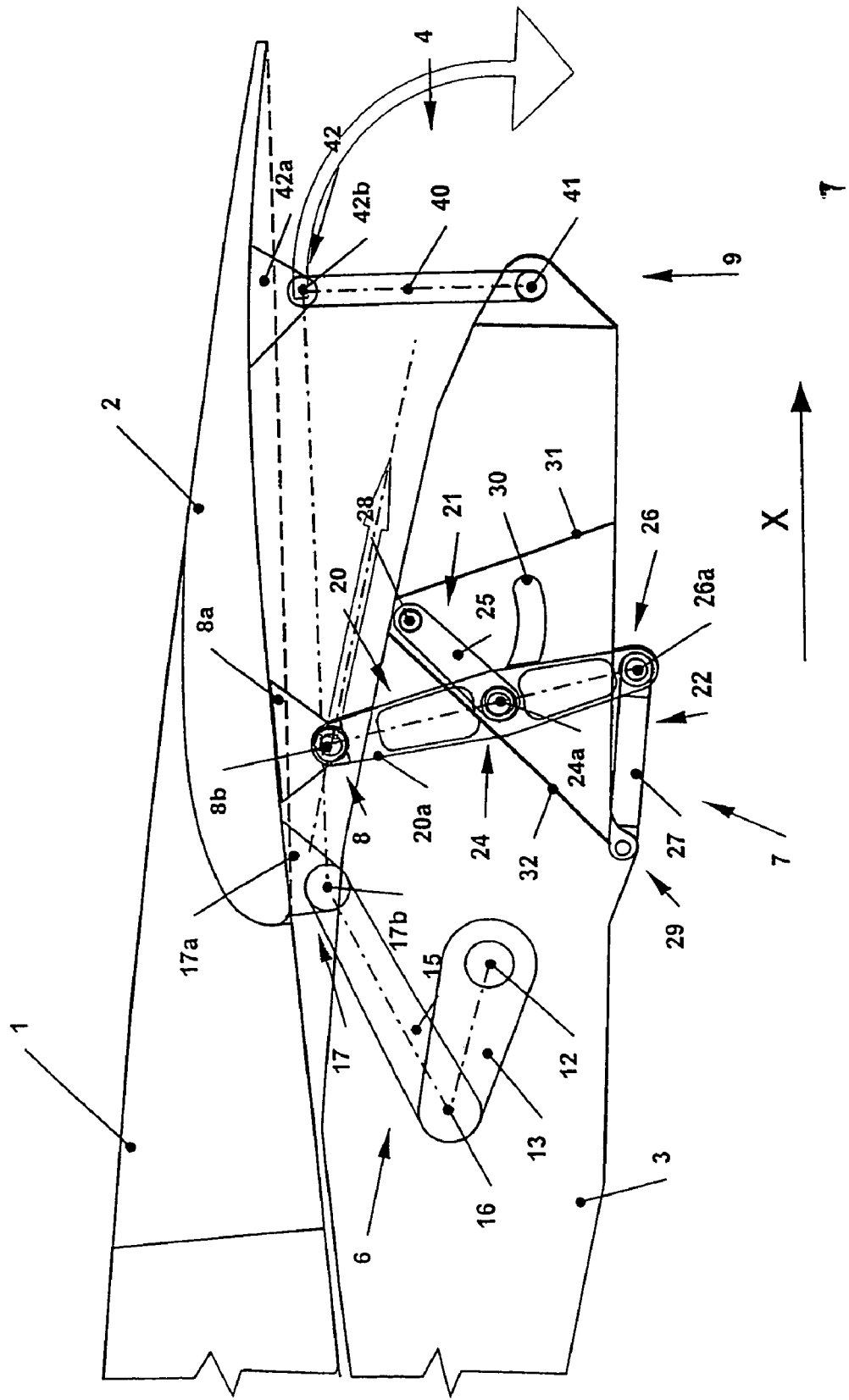
FIG. 1 is a longitudinal sectional view of the area of an airplane wing which, viewed in the flow direction, is in the rear and has a lift flap and an embodiment of the lift flap mechanism according to the invention with a first embodiment of a steering lever arrangement, the lift flap being in a retracted position.

In the description of the figures, characteristics carrying out the same functions were given the same names and were provided with the same reference numbers in the different figures.

The figures show a part of a wing or wing body 1 of an airplane which, viewed in the flow direction X (FIG. 1), is in the rear and has a trailing edge flap 2 as the example of a lift flap which can be adjusted by means of at least one flap mechanism 4 disposed on a flap track 3. For this purpose, a driving system 6 is also disposed on the flap track 3, for applying adjusting forces to the lift flap 2. Furthermore, the flap mechanism 4 according to the invention comprises a main connection mechanism 8 and a rear connection mechanism 9, the main connection mechanism 8 being used for carrying the essential weight loads and the air loads acting upon the trailing edge flap 2, and the rear connection mechanism 9 together with the main connection mechanism 8 being used for the kinematic guidance of the trailing edge flap 2.

On the airplane wing for which the invention is provided, normally several flap tracks 3 are provided which, viewed in the wing span direction Y, are arranged side-by-side and which preferably each have a flap mechanism 4 according to the invention. However, at least one flap track 3 with the flap mechanism 4 according to the invention is arranged on an airplane wing. The flap mechanism 4 may also be combined with other flap mechanisms known from the prior art. In a preferred use of the invention, at least two flap tracks 3, each having a flap mechanism 4 according to the invention, are arranged on an airplane wing. In another preferred application of the invention, the carrying and the adjusting of the lift flap may also take place by means of only one flap mechanism according to the invention arranged on a flap track, in which case a further carrying of the lift flap can take place by means of another flap mechanism according to the state of the art or by means of a spherical swivel bearing.

In the following, the invention will be described by means of one of preferably several flap tracks 3. First, a first embodiment of the invention illustrated in FIGS. 1 to 5 will be described:

The driving system 6, which is preferably arranged on the area of the lift flap 2 which, viewed in the flow direction or longitudinal direction X of the wing, is in the front, is constructed according to the state of the art and may be constructed in different manners. In a preferred embodiment, this driving system 6 is formed of a rotatory actuating drive 11 with a driving shaft 12, a combination moved by this driving shaft 12 which consists of a driving arm 13 and a driving guide rod 15 which are connected with one another by way of a hinge 16. The driving guide rod 15 acts by way of a driving joint 17 and a driving shaft 17a pertaining to the latter upon a driving fitting 17a provided on the trailing edge flap 2, which driving fitting 17a is preferably arranged on the front area of the lift flap 2. When the actuating drive 16 is operated, by way of the driving shaft 12, the driving arm 13 and the driving guide rod 15 act upon the driving fitting 17a in order to move or adjust the trailing edge flap 2.

Figure 5:
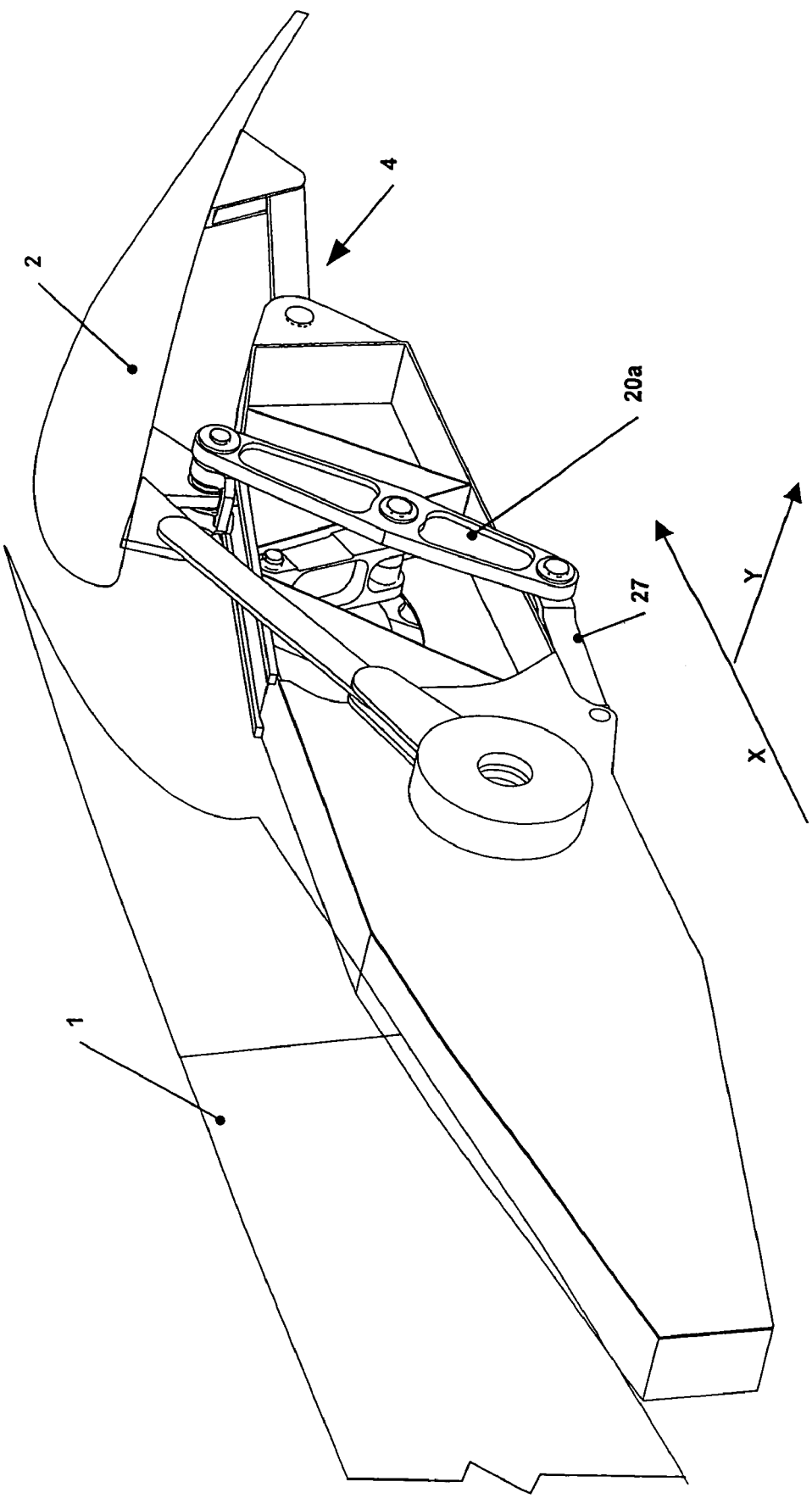
FIG. 5 is a perspective representation of the embodiment of FIGS. 1-4.
Figure 5B:
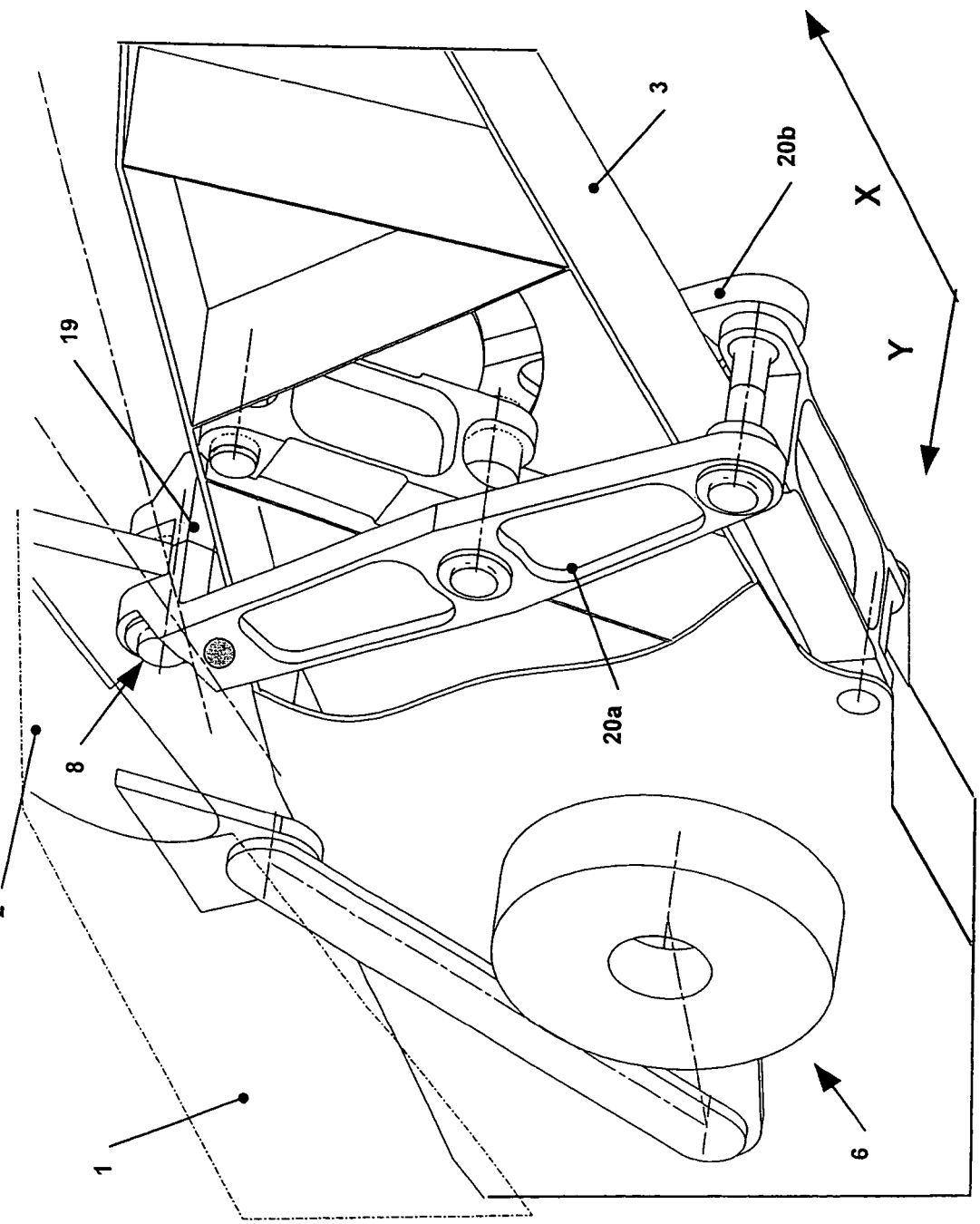
FIG. 5b is a perspective representation of the embodiment of the flap mechanism of the invention according to FIG. 1 with a second embodiment of the steering lever arrangement, the lift flap being in a retracted position.

In the representation of FIGS. 1 to 14, viewed in the flow direction X, the main connection mechanism 7 is arranged in front of the secondary connection mechanism 9. In principle, the main connection mechanism 7 may also be arranged behind the secondary connection mechanism 9. By way of a steering lever arrangement 20, the main connection mechanism 7 acts upon a main connection joint 8 with a main connection fitting 8a on the lift flap 2, which interacts with a main shaft 8b. In the first embodiment illustrated in FIGS. 1 to 5 as well as FIGS. 6 to 10, the steering lever arrangement is formed of two swinging guide rods or steering levers 20a, 20b (FIG. 5). In the case of the first embodiment of the steering lever arrangement 20, the steering levers 20a, 20b are situated laterally of the flap track 3, so that the flap track 3 is arranged between the steering levers 20a, 20b. For this purpose, each pair of steering levers 20a, 20b is mutually connected by way of the main shaft 8b extending between the latter, which main shaft 8b is preferably spherically disposed in the main connection fitting 8a of the main connection joint 8. The bearing may also be provided axially. More than two steering levers may also be provided in a steering lever arrangement 20.

As an alternative, the steering lever arrangement 20 in a second embodiment may also be formed of a steering lever which may be arranged between the flap track 3 or laterally thereof. Generally, at least one steering lever is provided in a steering lever arrangement 20.

Figure 14:
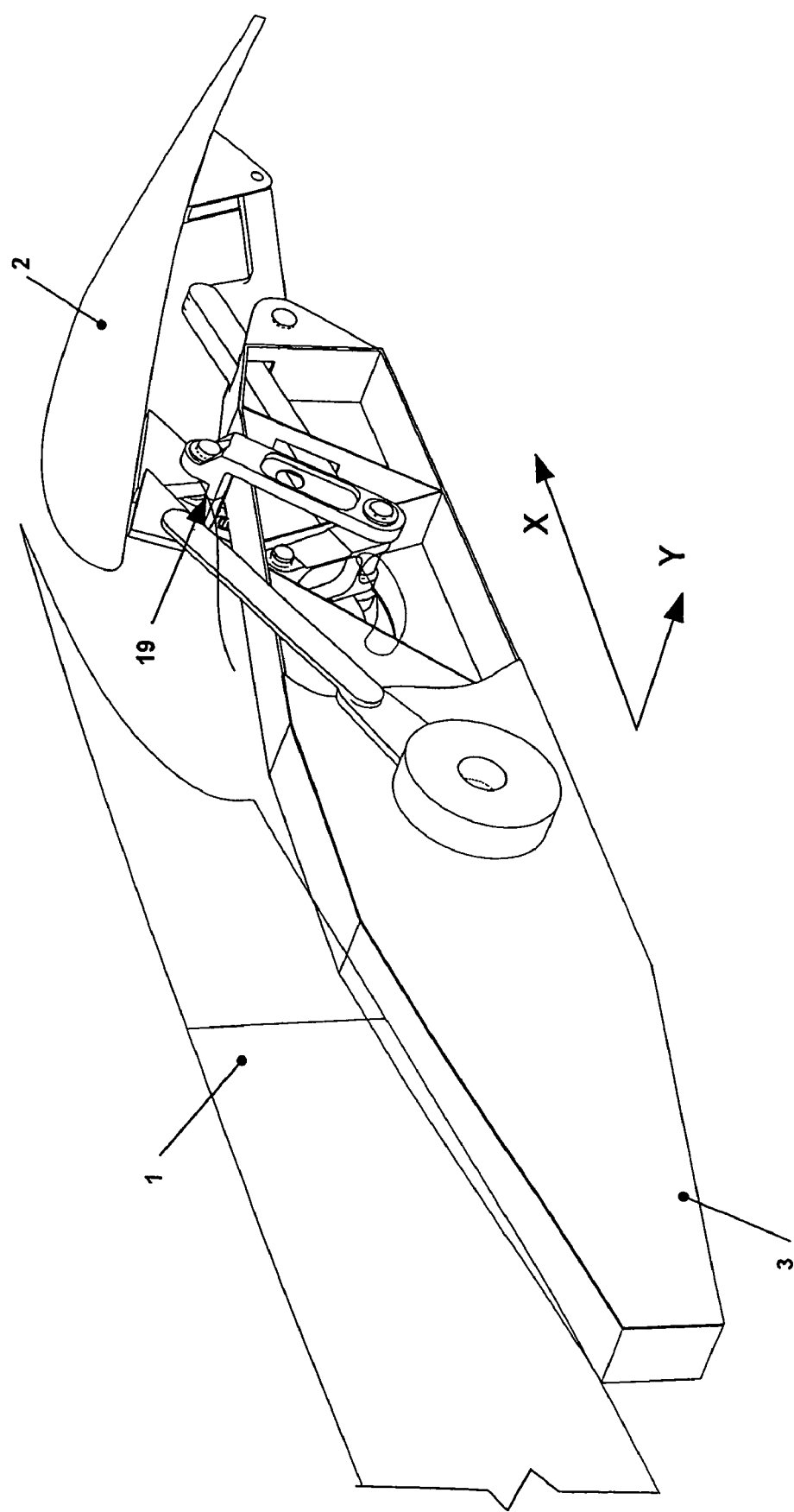
FIG. 14 is a perspective representation of the flap mechanism according to FIG. 11.

With respect to its design, the steering lever arrangement 20 can also be guided by means of one as well as by means of several steering levers on the flap track 20 by a guiding arrangement 18 which is arranged in the area of the main connection joint (FIGS. 1 to 10), or can be constructed without guidance on the flap track 3 FIG. 5b and FIGS. 11-14. In the latter construction, when two or more steering levers 20a, 20b are used, these are connected with one another by way of a bow 19 in the area of the main connection joint 8 (FIG. 5b; FIG. 14), which bow 19 is spaced away from the flap track 3. The steering levers may be connected with the bow 19 in one piece or by way of a connection point.

The guiding arrangement 18 has a steering-rod-side guide 18a and a track-side guide 18b and can be used for supporting the steering lever arrangement 20 in the X-direction as well as in the Y-direction. The concrete design of the guiding arrangement 18 is provided according to the state of the art, in which the steering-rod-side guiding device 18a is preferably constructed as a carriage 18c with one roller or more rollers 18d which interacts or interact with a rail 18e of the track-side guide 18b.

The at least one steering lever of the steering lever arrangement 20 is guided on the side of the flap track 3 by a first steering lever guide 21 and a second steering lever steering lever guide 22. The interaction of the first steering lever guide 21 and the second steering lever guide 22 has the result that a certain position of the main connection joint 7 is connected with a certain angular slope of the at least one steering lever.

The first steering lever guide 21 has a first steering lever joint 24 to which a pendulum 25 is connected which is connected with the flap track 3. The second steering lever guide 22 has a second steering lever joint 26 arranged in the at least one steering lever The joints 24, 26 are arranged in each provided steering lever 20a, 20b, that is, in each at least one steering lever 20a, 20b. The first steering lever joint has a shaft or swing shaft 24a which, when two or more steering levers are used per steering lever arrangement 20, mutually connects its steering levers. The pendulum 25 is disposed in the flap track 3 by means of a pendulum joint 28. In this manner, the pendulum 25 connects the flap track 3 with the at least one steering lever which is part of the steering lever arrangement 20, which causes the first steering lever joint 24 or the shaft 24a to carry out a circular motion.

The second steering lever guide 22 with the second steering lever joint 26 can be implemented in a different manner. In a first embodiment of the second steering lever guide 22 illustrated in FIGS. 1 to 5, the second steering lever joint 26, viewed in the longitudinal direction of the at least one steering lever, is arranged, at a distance from the first steering lever joint 24, at the at least one steering lever 20a, 20b. In this embodiment, the second steering lever joint 26, by means of a strut 27, which, by way of a shaft 26a, is disposed in the second steering lever joint 26, is coupled with a strut joint 29 arranged on the flap track 3. In the representation of FIGS. 1 to 5, the second steering lever joint 26 is arranged at the end of the steering lever arrangement situated opposite the main connection joint 8. Depending on the extension curve to be achieved, the strut 27 may also be linked to another point of the steering lever arrangement, particularly in the first steering lever joint 24.

Since, when two or more steering levers per steering arrangement are provided, the shaft 24a of the first steering lever joint 24 mutually connects several steering levers and extends between these, an opening or a slot 30 is optionally provided in the flap track 3, the swing shaft 24a extending through this opening or slot 30. The opening is not required when the shaft 24a is situated laterally of the pertaining flap track 3. Furthermore, one or more reinforcing ribs 31, 32 may be arranged on the flap track 3 in order to achieve a design of the flap track 3 which is advantageous with respect to the weight or the flux of force.

In an area on the lift flap 2 which, viewed in the flow direction X, is spaced away from the main connection joint 8, the secondary connection mechanism 9 is arranged which has a secondary connection joint 42. Viewed in the flow direction X, the main connection joint 8 may be arranged in front of or behind the secondary connection joint 42. As a result of the interaction between the main connection mechanism 8 and the secondary connection mechanism 9, a defined position of the driving joint 17 unambiguously determines a defined position of the secondary connection joint 42.

The secondary connection mechanism 9 comprises a guide lever 40 which, in turn, is disposed in a track-side guiding joint or fixed-point joint 41 on the flap track 3, and, on the other side, is disposed in the flap-side secondary joint 42. The secondary connection joint 42 preferably has a shaft 42b which interacts with a secondary connection fitting 43a arranged on the lift flap 2. Depending on the embodiment of the flap mechanism or the mobility of the lift flap 2 to be achieved, the secondary connection joint 42 may be a spherical or an only axially movable joint.

In the figures, the secondary connection mechanism 9 is arranged behind the main connection mechanism 7, viewed in the flow direction X. According to the invention, these mechanical devices 7, 9 may also be arranged in the reverse sequence with respect to one another.

Figure 2:
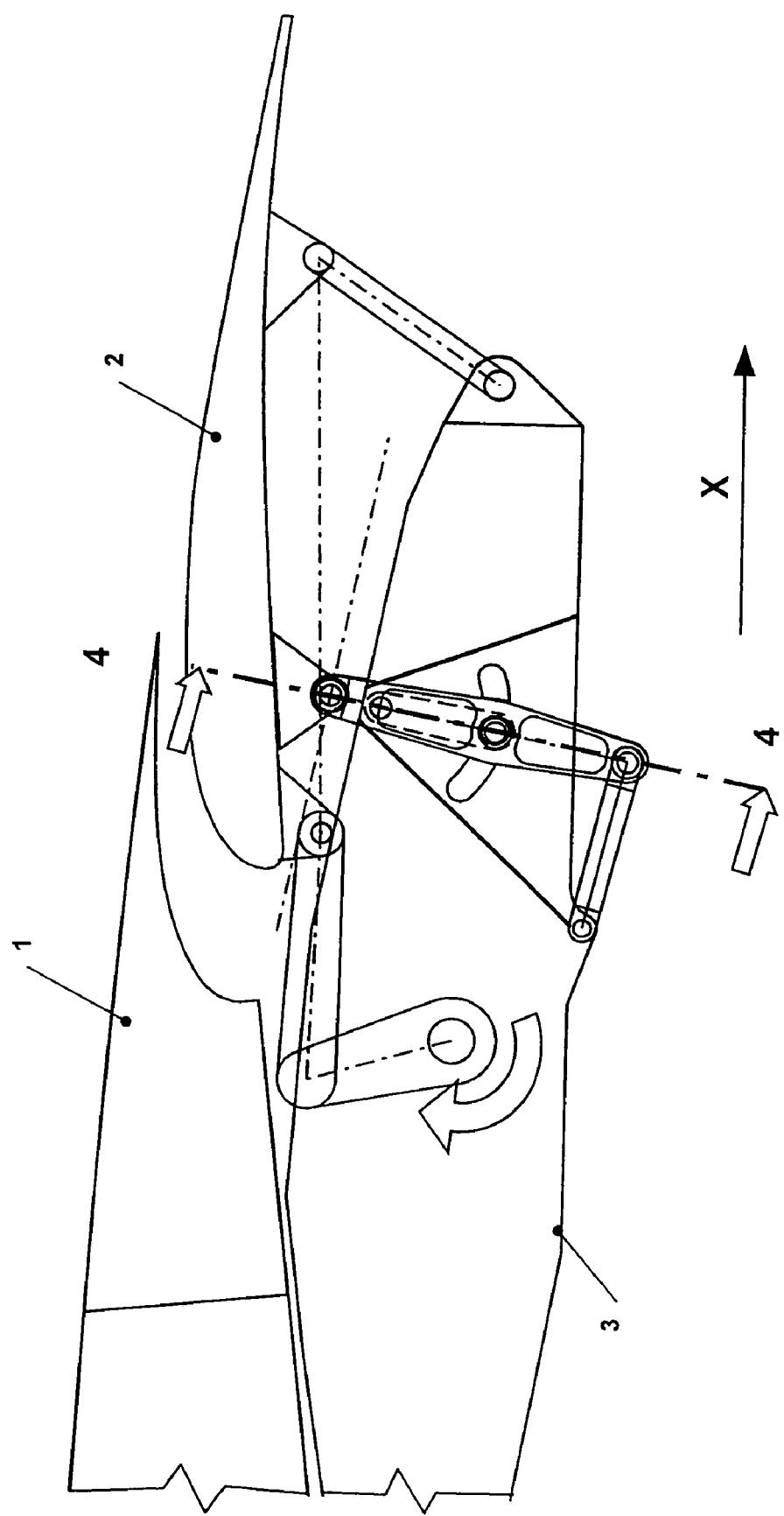
FIG. 2 is a longitudinal sectional view of the rear area of the airplane wing according to FIG. 1, the lift flap being in a central or partially extended position.
Figure 3:
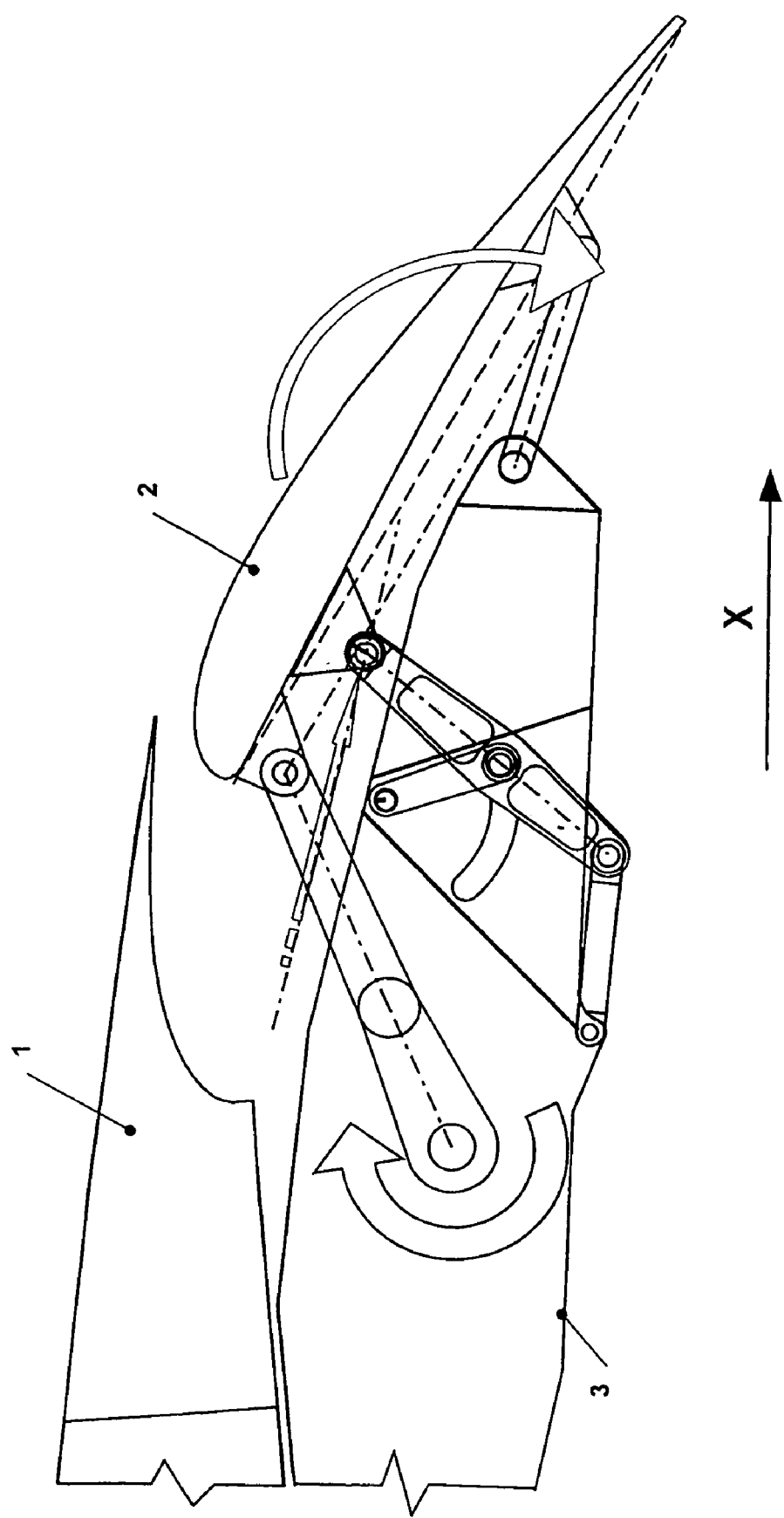
FIG. 3 is a longitudinal sectional view of the rear area of the airplane wing according to FIG. 1, the lift flap being in a completely extended position.
Figure 4:
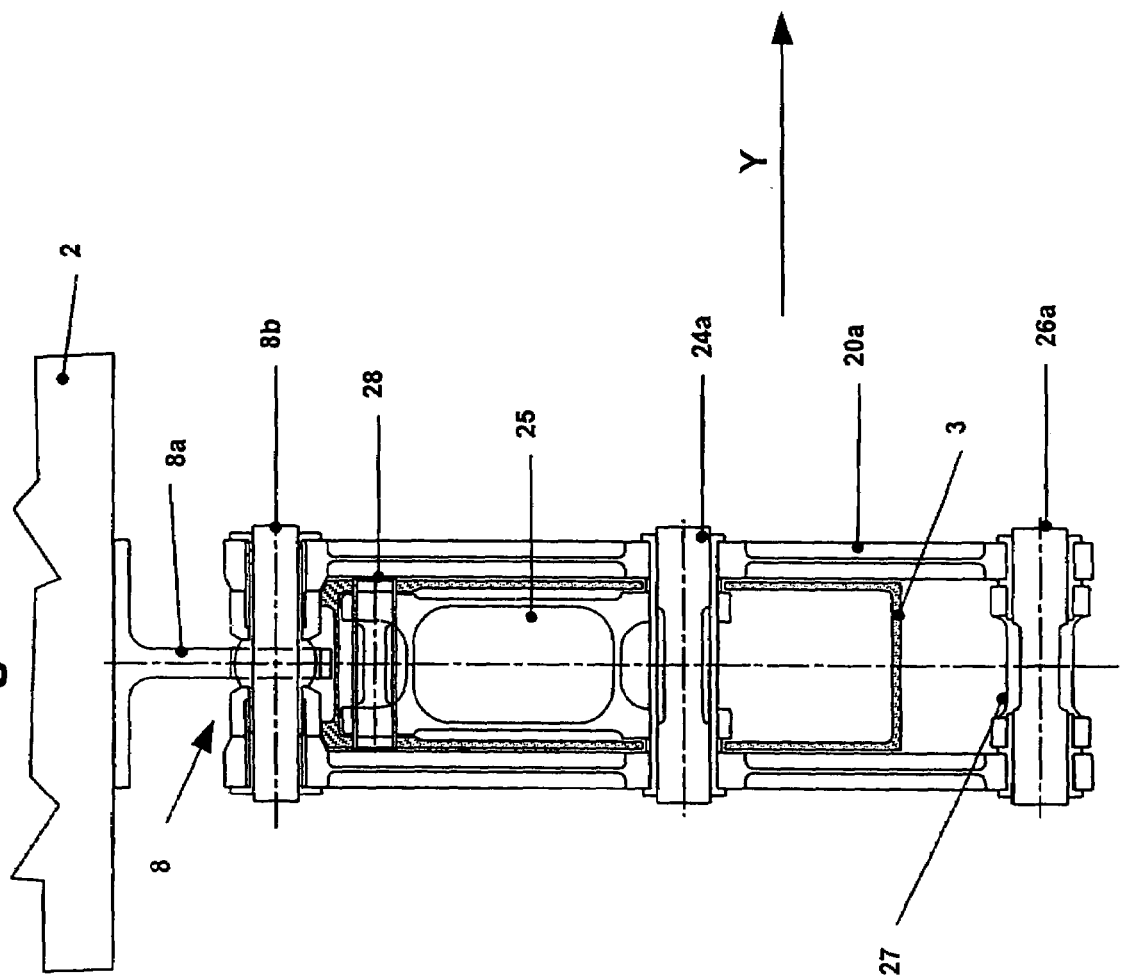
FIG. 4 is a cross-sectional view along Line 4-4 of FIG. 2.

The method of operation of the flap mechanism 4 according to the invention, for the embodiment illustrated in FIGS. 1 to 5, will be described in the following by means of FIGS. 1 to 3. FIG. 1 illustrates the lift flap 2 operated by the flap mechanism 4 in its retracted position. In order to move the lift flap 2 into an extended position, the driving system 6 is activated which generates the energy for moving the lift flap into a different position. The spatial orientation of the lift flap in its respective position is determined by the main connection mechanism 8 and the secondary connection mechanism 9 which as a result of their design according to the invention, can advantageously be adapted such that a quasi-linear movement of the lift flap 2 occurs. However, other forms of movement can also be achieved by means of the flap mechanism 4 according to the invention. By means of the secondary connection mechanism 9, the pitch moment of the lift flap 2 is compensated which occurs as a result of the weight of the lift flap as well as the external forces acting upon the latter. FIG. 2 shows a central extending position of the lift flap 2; and the extended position is illustrated in FIG. 3.

Another or second embodiment of the main connection mechanism 7 is shown in the following by means of FIGS. 6 to 10, the secondary connection mechanism 9 being as illustrated in FIGS. 1 to 5. The second embodiment of the main connection mechanism 7 has a steering lever arrangement 20 with at least one steering lever. FIGS. 6 to 10 show an embodiment of the steering lever arrangement 20 with two steering levers 20a, 20b, the steering levers 20a, 20b being situated on respective opposite sides of the flap track 3. The steering lever shaft 24a, to which the pendulum 25 is linked, therefore extends through an opening 30 correspondingly provided in the flap track 3. In contrast to the first embodiment of the main connection mechanism 7, in the case of the second embodiment, the second steering lever guide 22 is constructed such that the shaft 26a disposed in the second steering lever joint 26 is guided in a guiding slot 50, preferably by means of rollers 50a which is arranged in the flap track 3. This determines the kinematic mobility of the end of the steering lever arrangement 20 situated opposite the main connection joint 8, or of the at least one steering lever 20a, 20b. In this manner, as a result of the interaction of the first steering lever guide 21 and the second steering lever guide 22 with the slope or angular position of the steering lever arrangement 20, a defined and unambiguous position of the main connection joint 8 is determined.

Figure 6:
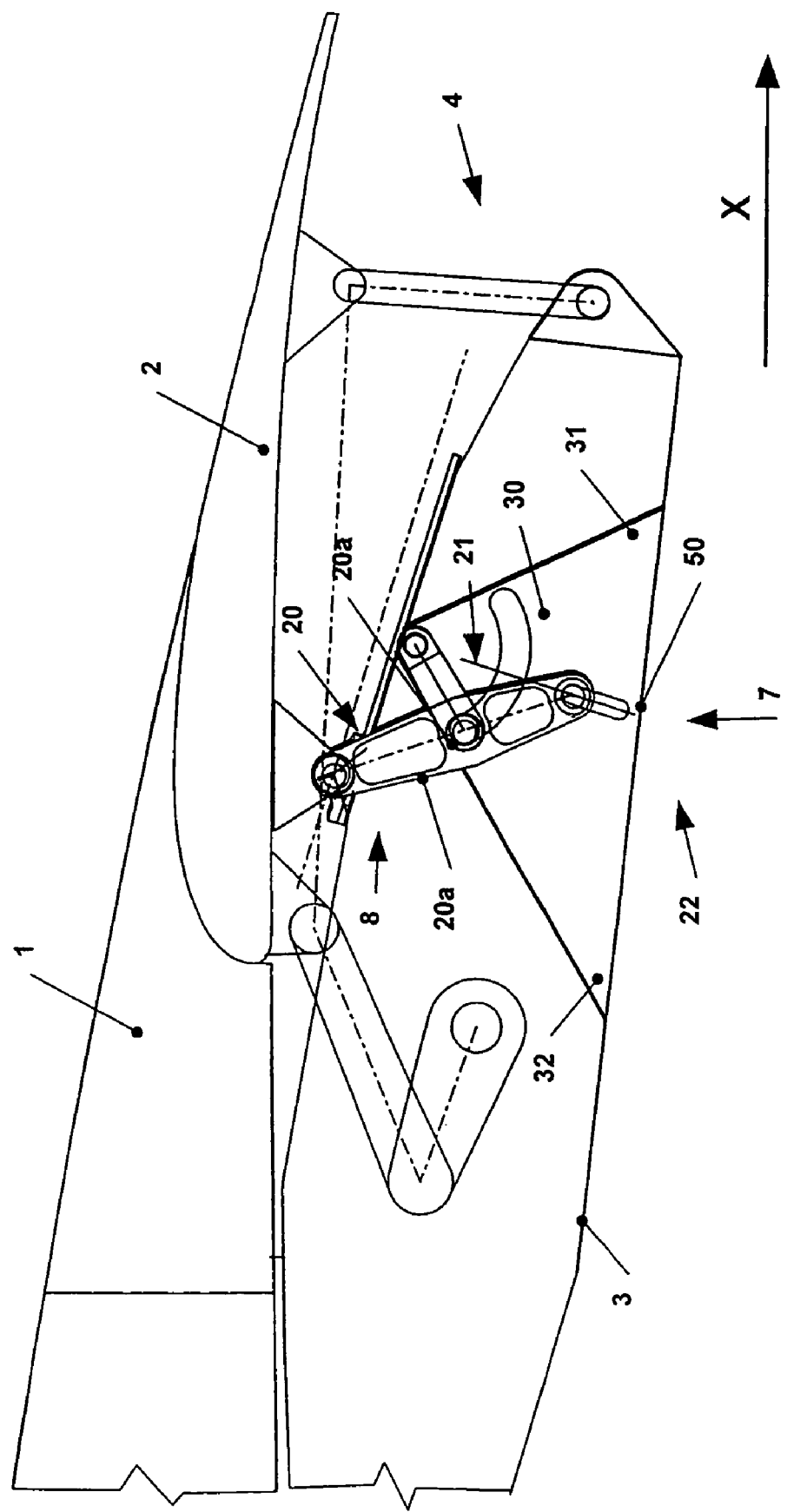
FIG. 6 is a longitudinal sectional view of the area of an airplane wing which, viewed in the flow direction, is in the rear and has a lift flap and another embodiment of the lift flap mechanism according to the invention with a first embodiment of a steering lever arrangement, the lift flap being in a retracted position.
Figure 7:
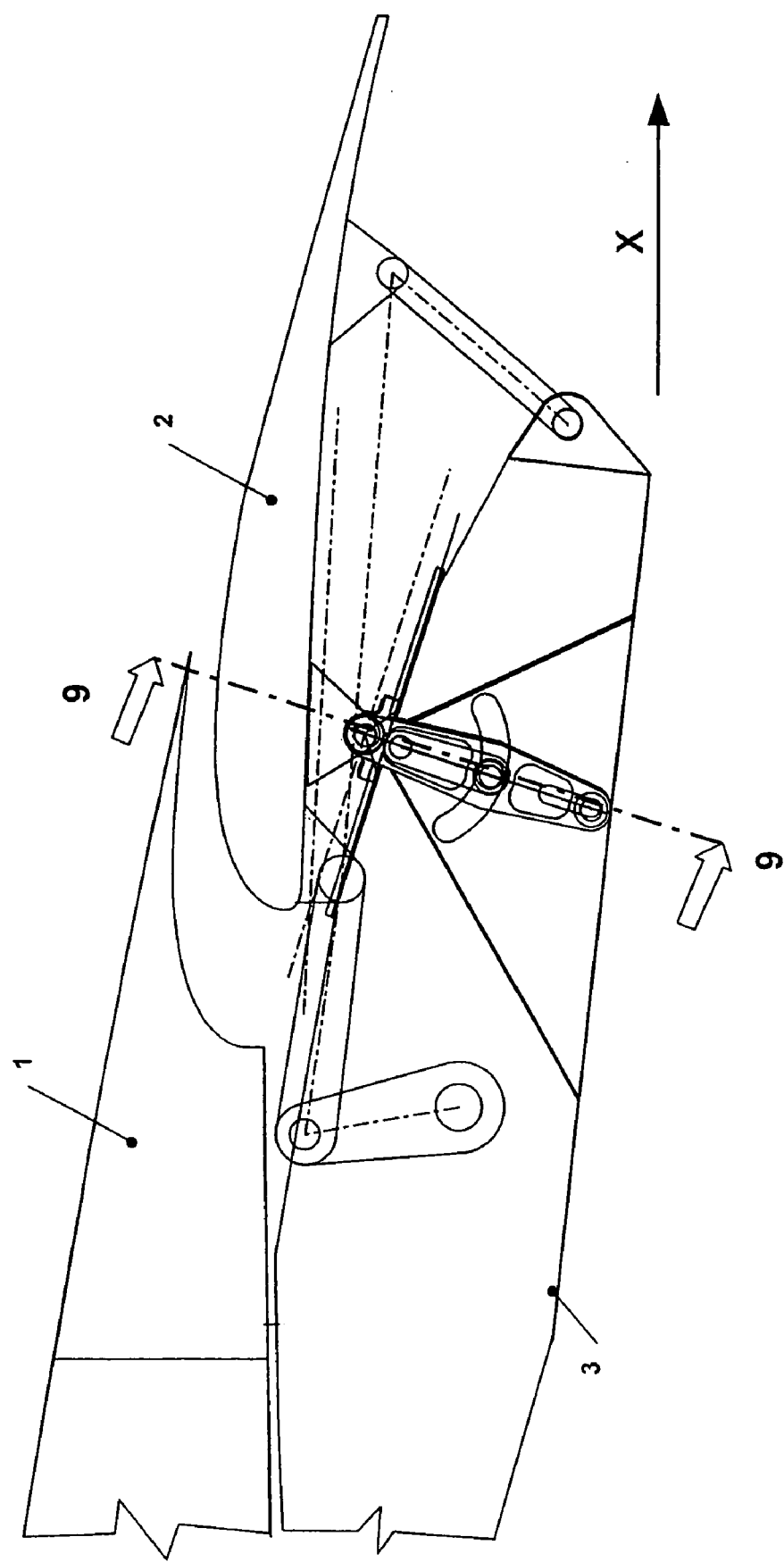
FIG. 7 is a longitudinal sectional view of the rear area of the airplane wing according to FIG. 6 in the case of a central or partially extended position of the lift flap.
Figure 8:
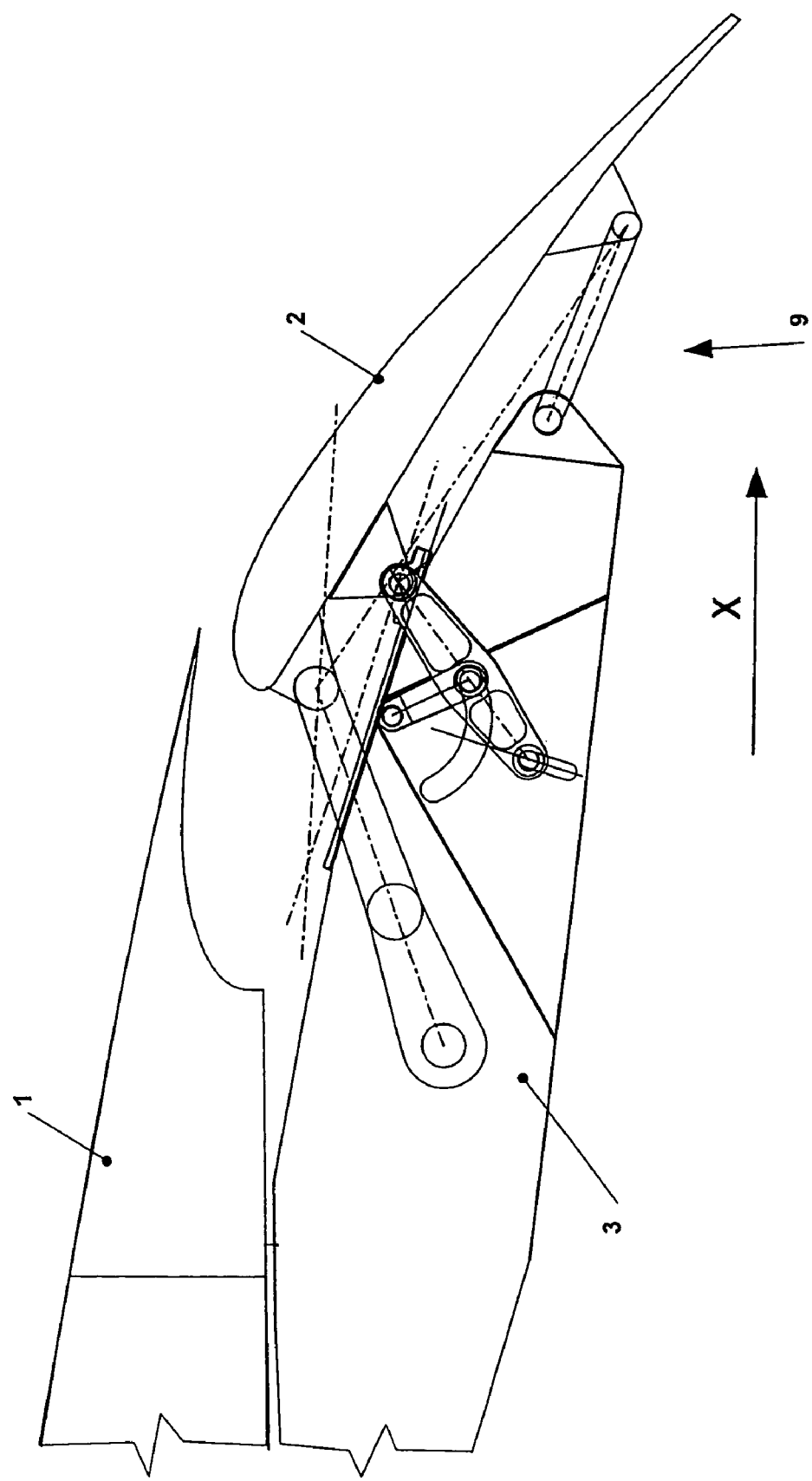
FIG. 8 is a longitudinal sectional view of the rear area of the airplane wing according to FIG. 6 in the case of a completely extended position of the lift flap.
Figure 9:
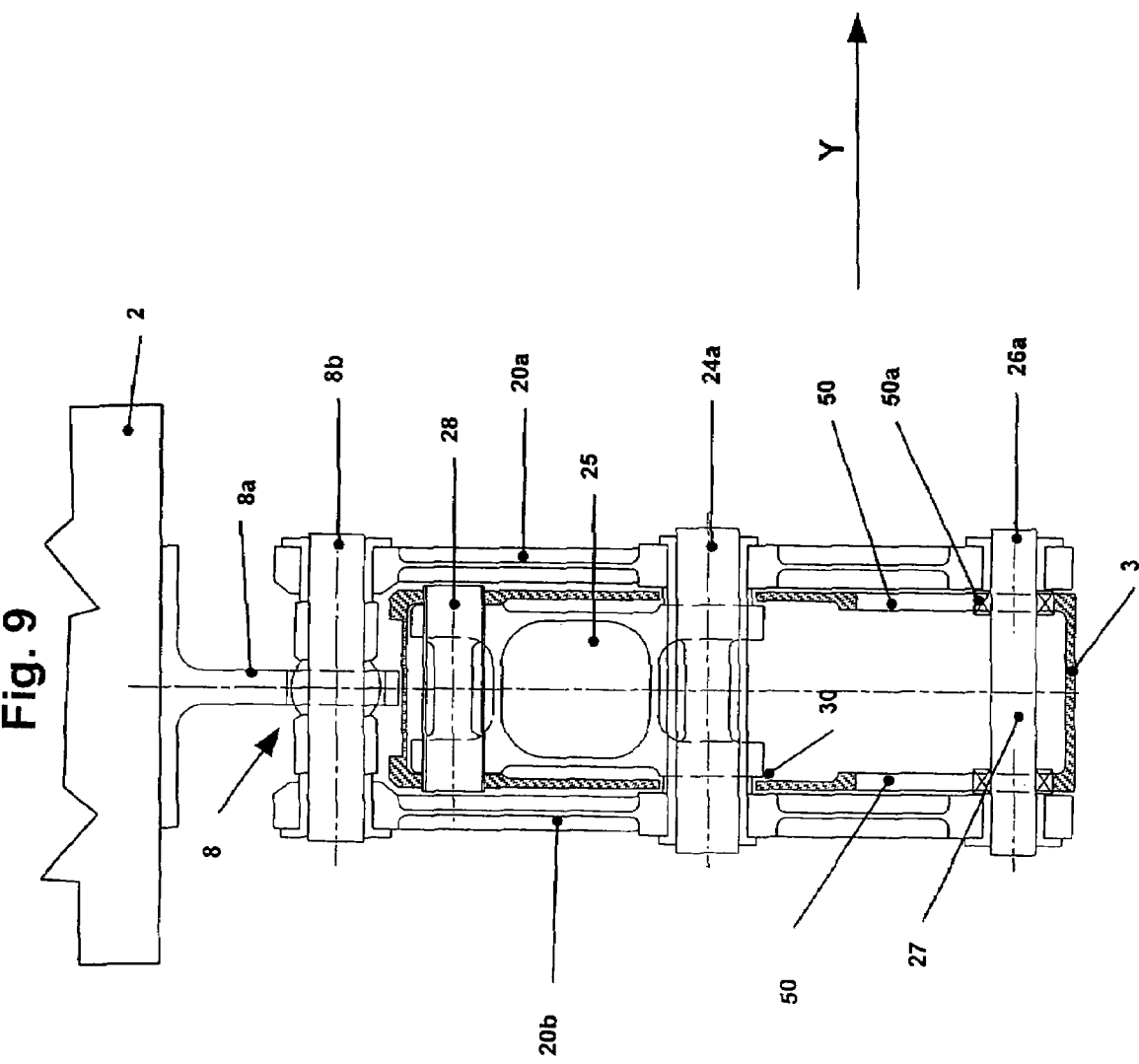
FIG. 9 is a cross-sectional view along Line 9-9 of FIG. 7.
Figure 10:
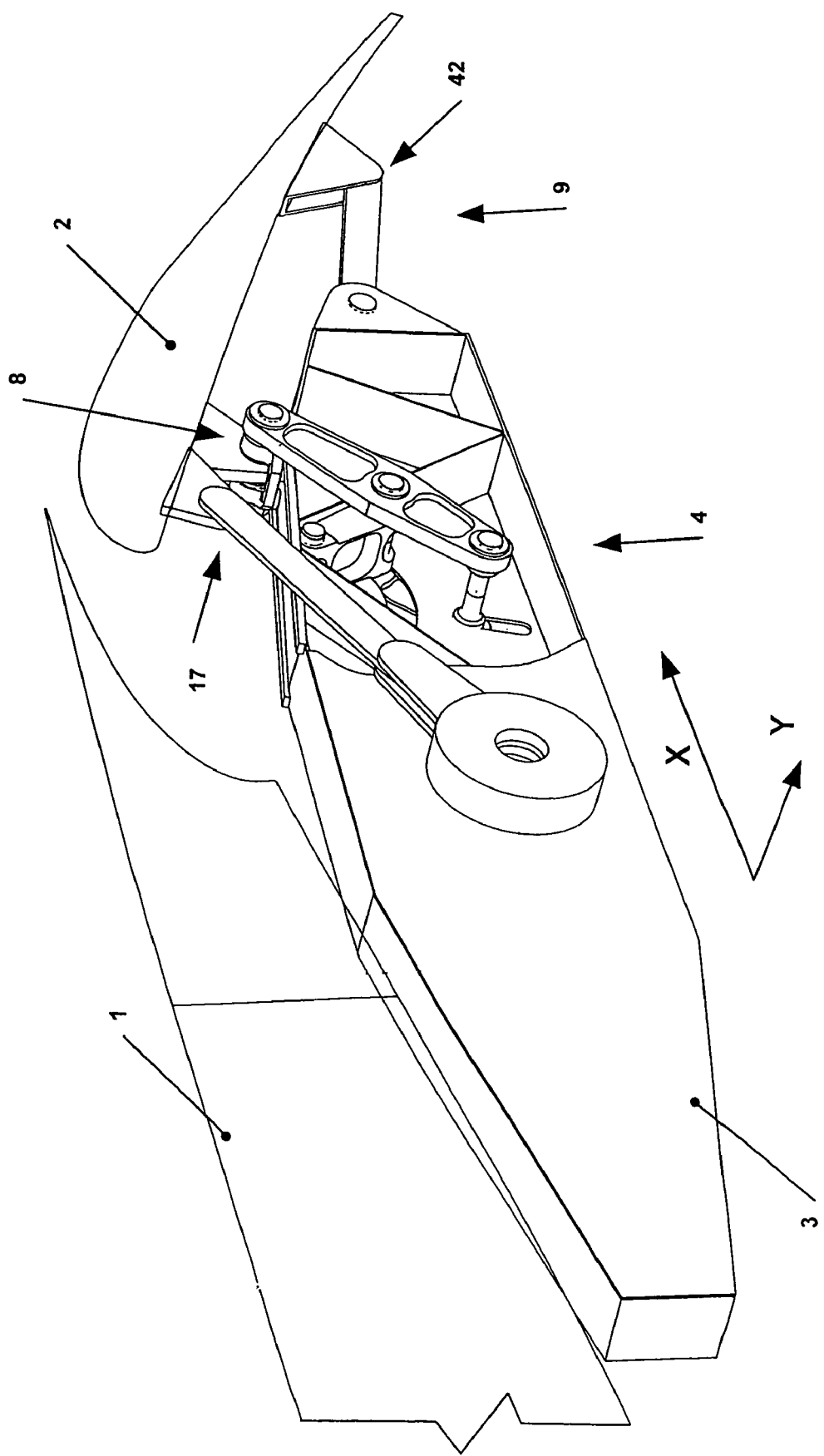
FIG. 10 is a perspective representation of the flap mechanism of the invention according to FIG. 6.
Figure 11:
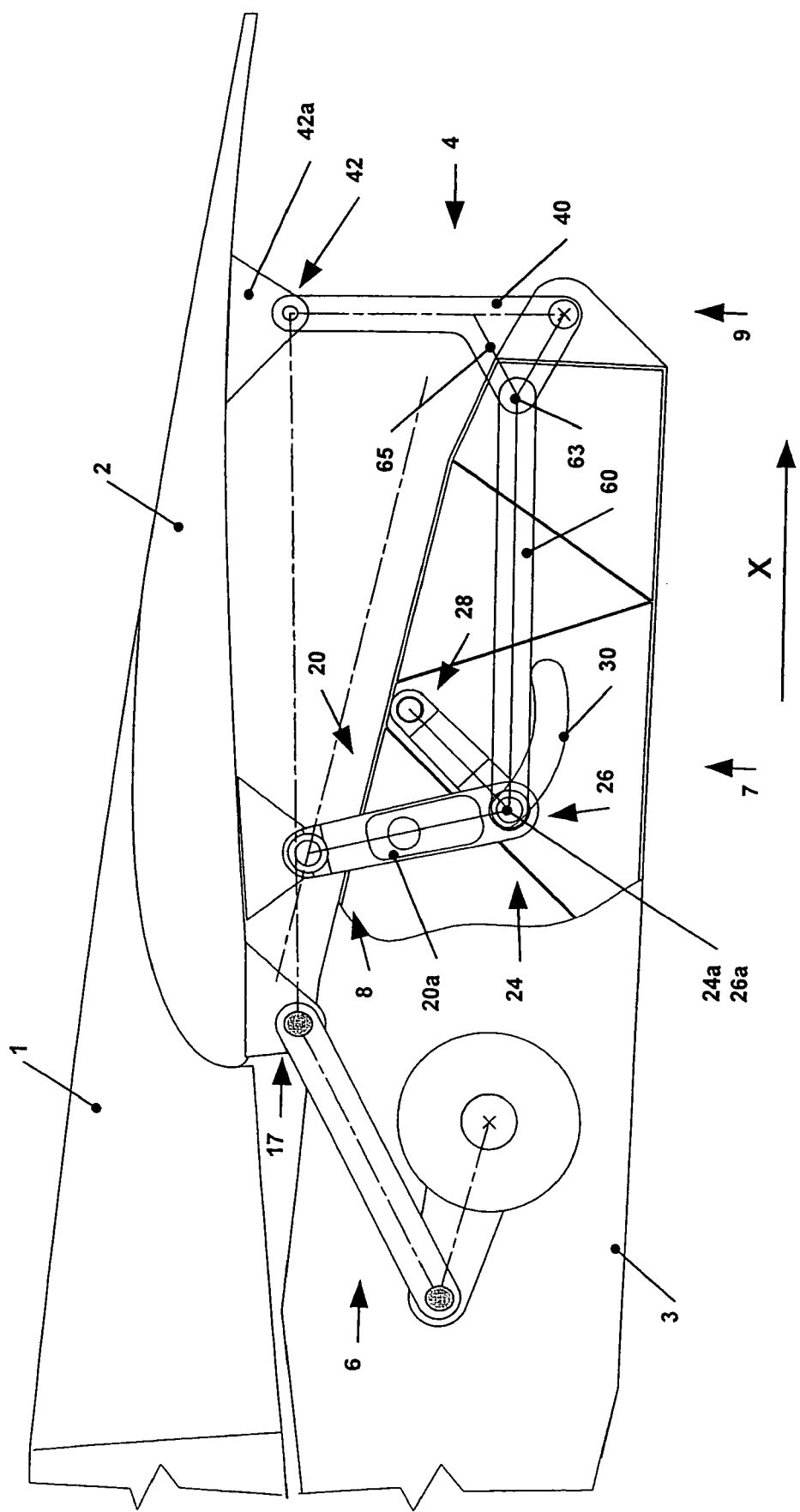
FIG. 11 is a longitudinal sectional view of the area of an airplane wing which, viewed in the flow direction, is in the rear and has a lift flap and a third embodiment of the lift flap mechanism according to the invention, the lift flap being in a retracted position.
Figure 12:
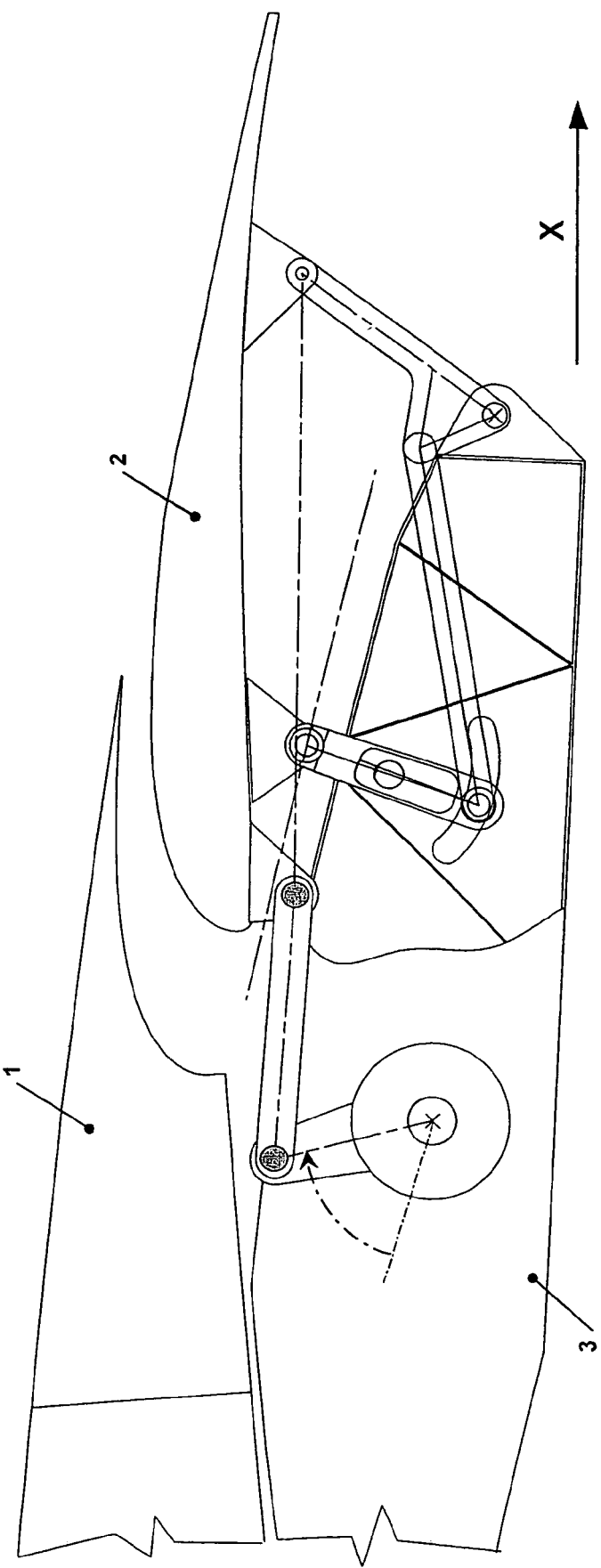
FIG. 12 is a longitudinal sectional view of the rear area of the airplane wing according to FIG. 11 in the case of a central or partially extended position of the lift flap.
Figure 13:
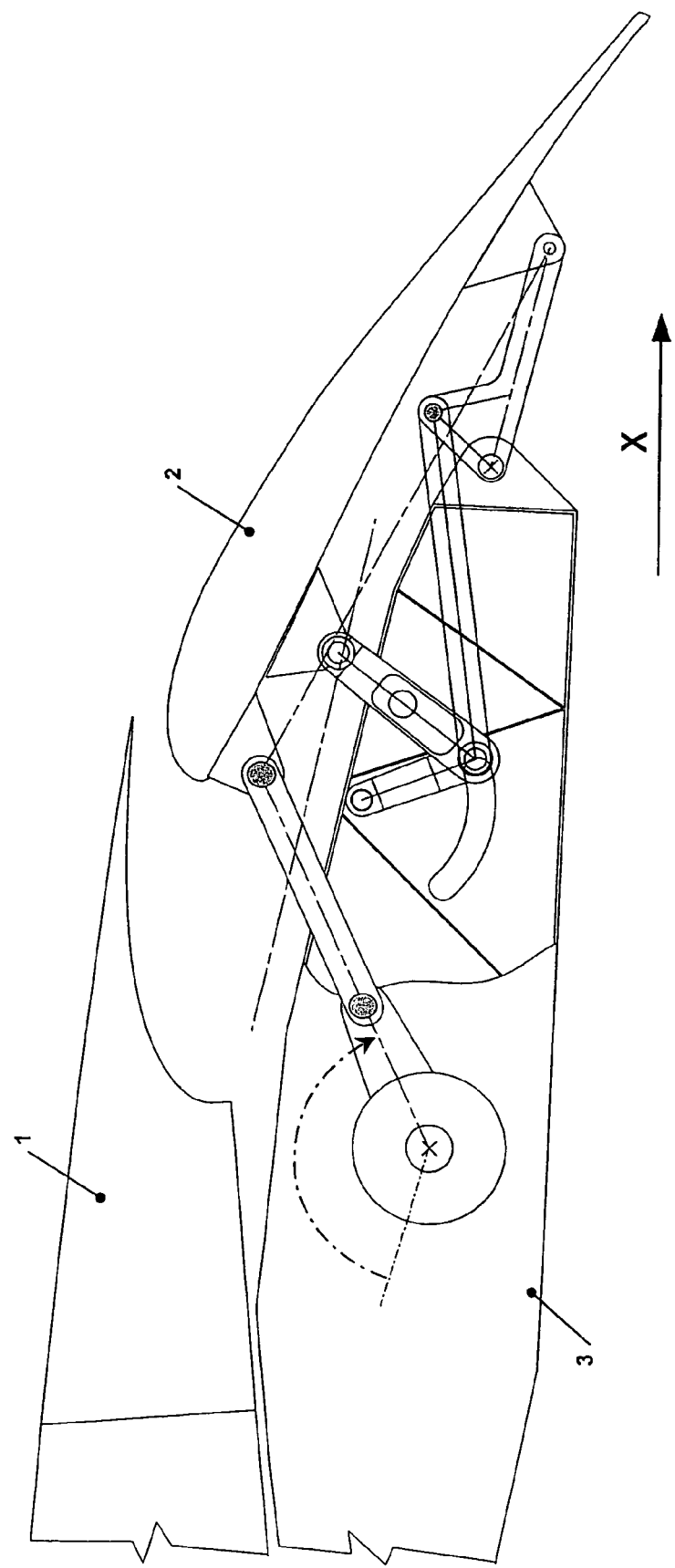
FIG. 13 is a longitudinal sectional view of the rear area of the airplane wing according to FIG. 11 in the case of a completely extended position of the lift flap.

The method of operation of the flap mechanism 4 according to the invention by means of the second embodiment of the main connection mechanism 7 is provided analogous to the method of operation of the first embodiment and is obtained by means of FIGS. 6 to 8, in which the lift flap 2 is illustrated in three different adjusting positions. FIG. 6 shows the flap mechanism 4 in a condition in which the lift flap 2 is in a retracted position. FIG. 7 shows the flap mechanism 4 or the lift flap 2 in a central extending position, while FIG. 8 shows the latter in its completely extended position.

According to the invention, the driving system 6 determines the position of the driving joint 17, but not the spatial orientation of the lift flap 2 as a function of its extending position. As an alternative to the arrangement of the driving system 6 illustrated in the embodiments of FIGS. 1 to 10, the latter may, however, also act directly onto one or several swing steering rods 20 or 20a, 20b, so that then the driving arm 13 and the driving steering rod 15 are provided in a different design or interact with components of the main connection or secondary connection mechanism.

The secondary connection mechanism 9 does not have to have a lever mechanism as described in FIGS. 1 to 10. It may also be guided in a different manner, for example, by means of a rail.

In another embodiment of the invention, which is illustrated in FIGS. 11 to 14, the main connection mechanism 7 and the secondary connection mechanism 9 are mechanically coupled with one another in order to cause an unambiguous position of the main connection joint 8 and of the secondary connection joint 42 in this manner at a certain angular position or orientation of the steering lever arrangement 20.

In this embodiment, a connection strut 60 is coupled to the second steering lever joint 26, which connection strut 60 mechanically couples the steering lever arrangement 20 or the at least one steering lever 20a, 20b with the guide lever 40. For this purpose, a connection joint 63 is arranged on the guide lever 40 for the bearing of the steering lever joint 20 on the guide lever 40. The connection strut 60 may also be disposed at a different point on the at least one steering lever or on an extension of the latter or on the pendulum 25. The location of the bearing point determines the extending curve of the lift flap so that, as a result of the selection of the bearing point as well as of the ratio of dimensions of the lift flap mechanism, a plurality of flap extending curves are obtained.

The position of the connection joint 63 on the guide lever 40 as well as the position of the second steering lever joint 26 on the at least one steering lever 20a, 20b depends on the effective lengths of the main connection mechanism 7 and of the secondary connection mechanism 9 as well as the adjusting curve of the lift flap 2 to be achieved. A projection or a spacing device 65 may in this case also be provided at the guide lever 40 (see FIGS. 11 to 14), in order to achieve an endeavored lever effect as a function of the angular position of the guide lever 40. For this purpose, such a spacing device may also be provided on the at least one steering lever 20a, 20b.

Also in the embodiment of the main connection and secondary connection mechanisms according to FIGS. 11 to 14, the second steering lever joint 26 is arranged particularly in the same position as the first steering lever joint 24. This can be implemented in that the shaft 24a of the first steering lever joint 24 is identical with the shaft 26a of the second steering lever joint 26. However, the second steering lever joint 26, to which the connection strut 60 is coupled, may generally also be spaced away from the first steering lever joint 24.

The method of operation of the described embodiments is analogous to the method of operation described by means of the embodiment according FIGS. 1 to 5.

The invention claimed is:

1. Lift flap mechanism for adjusting a lift flap assigned to an airplane wing by means of a driving system, the lift flap mechanism being disposed on at least one of several flap tracks fastened to the airplane wing, the lift flap mechanism, for carrying the load and for the kinematic guidance of the lift flap, comprising a main connection mechanism and a secondary connection mechanism in the form of a guide lever disposed in an articulated manner on the lift flap via a secondary connection joint and on the flap track, which secondary connection mechanism, viewed in the flow direction, is arranged at a distance from the main connection mechanism, wherein the main connection mechanism has a steering lever arrangement with at least one steering lever which has a first steering lever joint, a second steering lever joint and a main connection joint, the at least one steering lever by way of a pendulum coupled to the first steering lever joint being connected with the flap track, and the second steering lever joint being guided such that, by means of a defined angular position of the at least one steering lever, positions of the main connection joint and of the secondary connection joint are unambiguously determined.

2. Lift flap mechanism for adjusting a lift flap assigned to an airplane wing, according to claim 1, wherein, for guiding the second steering lever joint, a strut is linked to the latter, which strut is disposed in an articulated manner on the flap track.

3. Lift flap mechanism for adjusting a lift flap assigned to an air plane wing, according to claim 2, wherein the second steering lever joint is arranged on an end of the steering lever arrangement situated opposite the main connection joint.

4. Lift flap mechanism for adjusting a lift flap assigned to an air plane wing, according to claim 2, wherein the second steering lever joint is arranged in the first steering lever joint.

5. Lift flap mechanism for adjusting a lift flap assigned to an air plane wing, according to claim 1, wherein the second steering lever joint is guided by means of a shaft in a guideway which is arranged on the flap track.

6. Lift flap mechanism for adjusting a lift flap assigned to an air plane wing, according to claim 1, wherein, for guiding the second steering lever joint, a connection strut is linked to the latter, which connection strut is disposed in an articulated manner on the guide lever.

7. Lift flap mechanism for adjusting a lift flap assigned to an air plane wing, according to claim 1, wherein, for guiding the pendulum, a connection strut is linked to the latter, which connection strut is disposed in an articulated manner on the guide lever.

8. Lift flap mechanism for adjusting a lift flap assigned to an air plane wing, according to-claim 1, wherein the steering lever arrangement has at least two steering levers, each of which being situated in each case on opposite sides of the flap track.

9. Lift flap mechanism for adjusting a lift flap assigned to an air plane wing, according to claim 8, wherein the at least two steering levers in the area of the main connection joint by way of a guiding arrangement are supported by means of a steering-rod-side guiding device and a track-side guiding device on the flap track.

10. Lift flap mechanism for adjusting a lift flap assigned to an air plane wing, according to claim 8, wherein the at least two steering levers in the area of the main connection joint are mutually connected by way of a bow.

11. Lift flap mechanism for adjusting a lift flap assigned to an air plane wing, according claim 8, wherein the pendulum is arranged on the first steering lever joint between two steering levers.

12. Lift flap mechanism for adjusting a lift flap assigned to an air plane wing, according to claim 1, wherein the main connection joint is constructed as a spherical bearing.

13. Arrangement of at least two flap tracks of an airplane wing, wherein a lift flap mechanism according to claim 1 is arranged on at least one flap track.

14. Lift flap mechanism for adjusting a lift flap assigned to an airplane wing, according to claim 9, wherein the pendulum is arranged on the first steering lever joint between two steering levers.

15. Lift flap mechanism for adjusting a lift flap assigned to an airplane wing, according to claim 9, wherein the at least two steering levers in the area of the main connection joint are mutually connected by way of a bow.

* * * * *